(12) United States Patent
Stabler (10) Patent No.: US 11,761,575 B1
(45) Date of Patent: Sep. 19, 2023

(54) RETRACTABLE LEG SPIKE

(71) Applicant: Joshua Stabler, Merriam, KS (US)

(72) Inventor: Joshua Stabler, Fairway, KS (US)

( * ) Notice: Subject to any disclaimer, the term of this patent is extended or adjusted under 35 U.S.C. 154(b) by 0 days.

(21) Appl. No.: 18/070,904

(22) Filed: Nov. 29, 2022

(51) Int. Cl.
  *F16M 11/00* (2006.01)
  *F16M 11/24* (2006.01)
  *A45F 3/44* (2006.01)

(52) U.S. Cl.
  CPC ............. *F16M 11/247* (2013.01); *A45F 3/44* (2013.01)

(58) Field of Classification Search
  CPC .................................. F16M 11/247; A45F 3/44
  See application file for complete search history.

(56) References Cited

U.S. PATENT DOCUMENTS

| | | | | |
|---|---|---|---|---|
| 2,480,382 A | * | 8/1949 | Pagliuso | F16B 7/1472 135/81 |
| 2,667,885 A | * | 2/1954 | Prete | A61H 3/0288 135/81 |
| 3,901,258 A | * | 8/1975 | Montgomery | A45B 9/04 135/81 |
| 5,320,316 A | * | 6/1994 | Baker | F16M 11/36 248/163.1 |
| 6,031,170 A | * | 2/2000 | Hoshino | G10D 13/065 84/422.2 |
| 7,654,494 B2 | * | 2/2010 | Cartoni | F16M 11/36 248/163.1 |
| 8,047,498 B1 | * | 11/2011 | Karty | F16M 11/36 248/156 |
| 8,084,676 B2 | * | 12/2011 | Shigenaga | G10D 13/02 84/421 |
| 8,317,141 B2 | * | 11/2012 | Fischer | F16M 11/36 396/419 |
| 9,093,051 B2 | * | 7/2015 | Sato | G10D 13/065 |
| 9,675,146 B1 | * | 6/2017 | Howell | A45B 23/00 |
| 10,281,081 B2 | * | 5/2019 | Busarow | F16M 11/26 |
| 2001/0048059 A1 | * | 12/2001 | Jones, II | A47B 97/08 248/161 |
| 2017/0193862 A1 | * | 7/2017 | Warnes | G09F 19/228 |
| 2023/0017652 A1 | * | 1/2023 | Gabbard | F16M 11/247 |
| 2023/0062070 A1 | * | 3/2023 | Delgado | F16M 11/247 |

* cited by examiner

*Primary Examiner* — Amy J. Sterling
(74) *Attorney, Agent, or Firm* — Buckley, Maschoff & Talwalkar LLC (57) ABSTRACT

Provided is a leg spike for a tripod apparatus. The leg spike can retract in and out of a a leg of a tripod. In one example, the leg spike includes an inner hollow tube section with the leg spike therein which is attached to a sliding pin that enables the leg spike to retract in and out of the inner hollow tube section, and an outer hollow tube section that fits over the inner hollow tube section and includes a turning mechanism which allows the sliding pin to move up or down with respect to the outer hollow tube section causing the retractable leg spike to move in and out of the inner hollow tube section when a turning force is applied, and prevents the inner hollow tube section from moving up and down with respect to the outer hollow tube section when the turning force is applied.

16 Claims, 6 Drawing Sheets

200B
(Partially Deployed State)

FIG. 2A
(Retracted State)

200B  FIG. 2B
(Partially Deployed State)

250C      FIG. 2C (Fully Deployed State)

RETRACTABLE LEG SPIKE

BACKGROUND

A tripod is often used to stabilize and elevate an object such as a camera, a scope, a rifle, and the like. In some cases, the legs of the tripod may be retractable. Here, the legs may include a plurality of tubular sections with different diameters. For example, an upper tubular section at the top of the leg may have the largest diameter enabling the upper tubular section to slide over and hide the lower tubular sections of the leg. When in use, the lower tubular sections may be pulled out to a desired length and locked using leg locks. When finished, the lower tubular sections may be collapsed into the upper tubular section allowing the tripod to be compactly stored.

The legs of a tripod are often equipped with feet that touch the ground. The feet typically come in a flat shape for gripping smoothly on a flat surface. However, there are times when a tripod may be in rougher terrain. In these situations, the tripod may struggle to maintain its grip on the terrain especially when holding something that exerts force like a rifle, or the like.

SUMMARY

According to an aspect of an example embodiment, provided is a tripod apparatus that includes one or more legs. Each leg includes an inner hollow tube section that includes a retractable spike, wherein the inner hollow tube section further includes a static pin that is attached thereto and a sliding pin positioned within a recess, and the sliding pin is attached to the retractable spike and enables the retractable spike to slide within the recess. Each leg may also include an outer hollow tube section that fits over the inner hollow tube section and includes a first slot that receives the static pin and a second slot that receives the sliding pin. The second slot is below the first slot and the second slot allows the sliding pin to move up or down with respect to the outer hollow tube section causing the retractable leg spike to in and out of the inner hollow tube section when a turning force is applied, and the first slot prevents the static pin from moving up and down with respect to the hollow tube section when the turning force is applied.

According to an aspect of another example embodiment, provided is an apparatus that includes an inner hollow tube section that includes a retractable leg spike. The inner hollow tube section further includes a static pin that is attached thereto and a sliding pin positioned within a recess. The sliding pin is attached to the retractable leg spike and enables the retractable leg spike to slide within the recess, and an outer hollow tube section that fits over the inner hollow tube section and comprises a first slot that receives the static pin and a second slot that receives the sliding pin. The second slot is below the first slot and the second slot allows the sliding pin to move up or down with respect to the outer hollow tube section causing the retractable leg spike to move in and out of the inner hollow tube section when a turning force is applied, and the first slot prevents the static pin from moving up and down with respect to the hollow tube section when the turning force is applied.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a leg spike that can be deployed on a bottom of a tripod leg. The leg spike can be pushed out from a bottom of the tripod leg and stick into terrain located below the tripod in a better gripping manner than a flat foot. Therefore, the leg spike can create a friction force that prevents the tripod from moving when it is deployed. This can be especially beneficial when the tripod is holding a weapon such as a firearm which can recoil (i.e., kickback) upon firing.

One of the benefits of the leg spike is that it is retractable and can be deployed on demand by a user. In particular, the leg spike includes a turning mechanism which "activates" the leg spike causing it to move out from a bottom of the leg. The user can also turn the turning mechanism the other way (opposite way) to retract the leg spike back into the bottom of the tripod leg where it can remain until deployed again by the user.

The retractable leg spike may include multiple components including a tripod leg with a hollow tube section (referred to herein as an inner hollow tube section), an outer tube section that fits over the inner hollow tube section and comprises an opening on the bottom thereof, and a leg spike that is positioned inside the inner hollow tube section. The inner tube section and the outer tube section create a turning mechanism.

According to various embodiments, the inner tube section may include two pins that are attached thereto. A first pin is referred to herein as a lateral pin since it does not move vertically, only laterally. Meanwhile, a second pin is referred to herein as a diagonal sliding pin because it slides both vertically and laterally at the same time (i.e., diagonally). The sliding forced can be created by a user turning the outer hollow tube. This is because the outer hollow tube has two slots therein that correspond to the two pins.

For example, the outer tube section may include a first slot that has a lateral recess shape and which holds the first pin (lateral pin). The first slot allows the first pin to move laterally while at the same time it prevents the first pin from moving up or down. The outer tube slot also includes a second slot that has a diagonal shape with respect to the lateral shape of the first slot. The second slot holds the second pin (sliding pin) and allows the second pin to slide along the diagonal slot while a turning force is applied. That is, the second slot allows the sliding pin to move downward thus causing the attached retractable leg spike to move downward. This is because the first pin is not attached to the retractable leg spike. Therefore, the restricted vertical movement of the first pin does not affect the downward movement of the retractable leg spike.

According to various embodiments, first pin/lateral pin provides a stabilizing force that prevents the inner hollow tube section from moving vertically with respect to the outer hollow tube section while still allowing the inner hollow tube section to turn/rotate with respect to the outer hollow tube section that fits over it. Essentially, the first pin keeps the outer hollow tube section and the inner hollow tube section in place vertically with respect to each other while allowing the outer hollow tube section to move laterally around the inner hollow tube section. Accordingly, when a turning force is applied, the outer hollow tube section moves around the inner hollow tube section which stays in its place. Meanwhile, the retractable leg spike disposed inside the inner hollow tube section (and attached to the sliding pin) is able to move freely in and out of the inner hollow tube section based on the turning force applied because the inner hollow tube section does not move.

The outer hollow tube section may be referred to as an outer barrel cam tube. The outer hollow tube section is slightly larger in diameter than the inner hollow tube section and is also hollow so that the outer hollow tube section fits snugly over the inner hollow tube section. The outer hollow tube section may include a partially open bottom or a fully open bottom that does not restrict movement of the retractable leg spike as it slides in and out of the bottom of the inner hollow tube.

Figure 1:
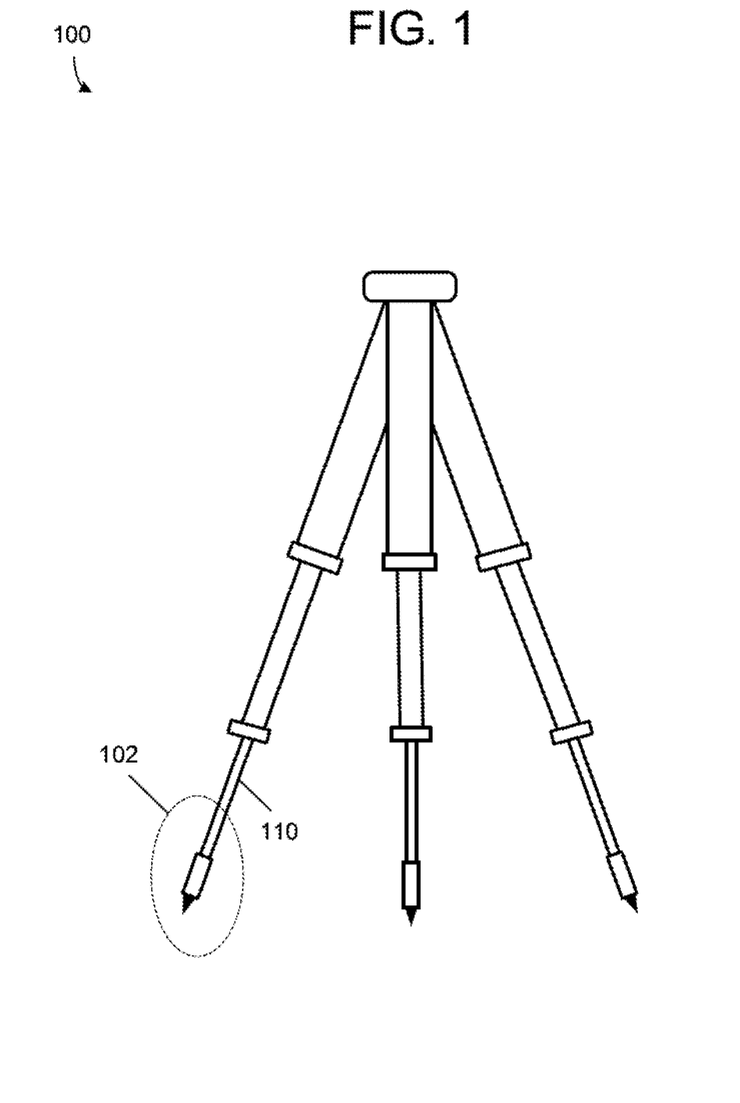
FIG. 1 is a diagram illustrating a tripod apparatus with a plurality of tripod legs in accordance with an example embodiment.

FIG. 1 illustrates a tripod apparatus 100 after a plurality of tripod legs 110 have been extended in accordance with an example embodiment. As an example, the tripod apparatus 100 may include three legs or it may include a different amount of legs such as one leg, two legs, four legs, or more. According to various embodiments, a retractable leg spike apparatus 102 is attached at a bottom of the tripod legs 110. The retractable leg spike includes a spike that can be pushed down from a bottom of the tripod leg for digging into terrain where the tripod apparatus 100 is deployed. For example, if the tripod apparatus 100 is stood on a loose area such as dry dirt, mud, sand, rocks, mountains, etc., the spike can dig into the ground below and provide more stabilizing force for holding the tripod apparatus 100 still. Each leg 110 may include a similar retractable leg spike apparatus 102 however its not required that all legs have the retractable leg spike apparatus 102. In other words, only some but not all of the legs of the tripod apparatus 100 may include the retractable leg spike apparatus 102.

The tripod apparatus may include a support 104 for holding and elevating a piece of equipment such as a camera, a scope, a rifle, or the like. Each of the legs may be collapsible or otherwise retractable. In this example, each leg includes three tubular leg sections. However, it should be appreciated, that the number of tubular leg sections may be different than three, for example, two, four, or more. The tubular leg sections may expand when pulled downward enabling the tripod legs to expand until fully extended. Likewise, the tubular leg sections can be collapsed causing the tripod legs to compress back into an upper leg section. The retractable leg spike apparatus 102 may be attached at a bottom end of a tripod leg 110.

Figure 2A:
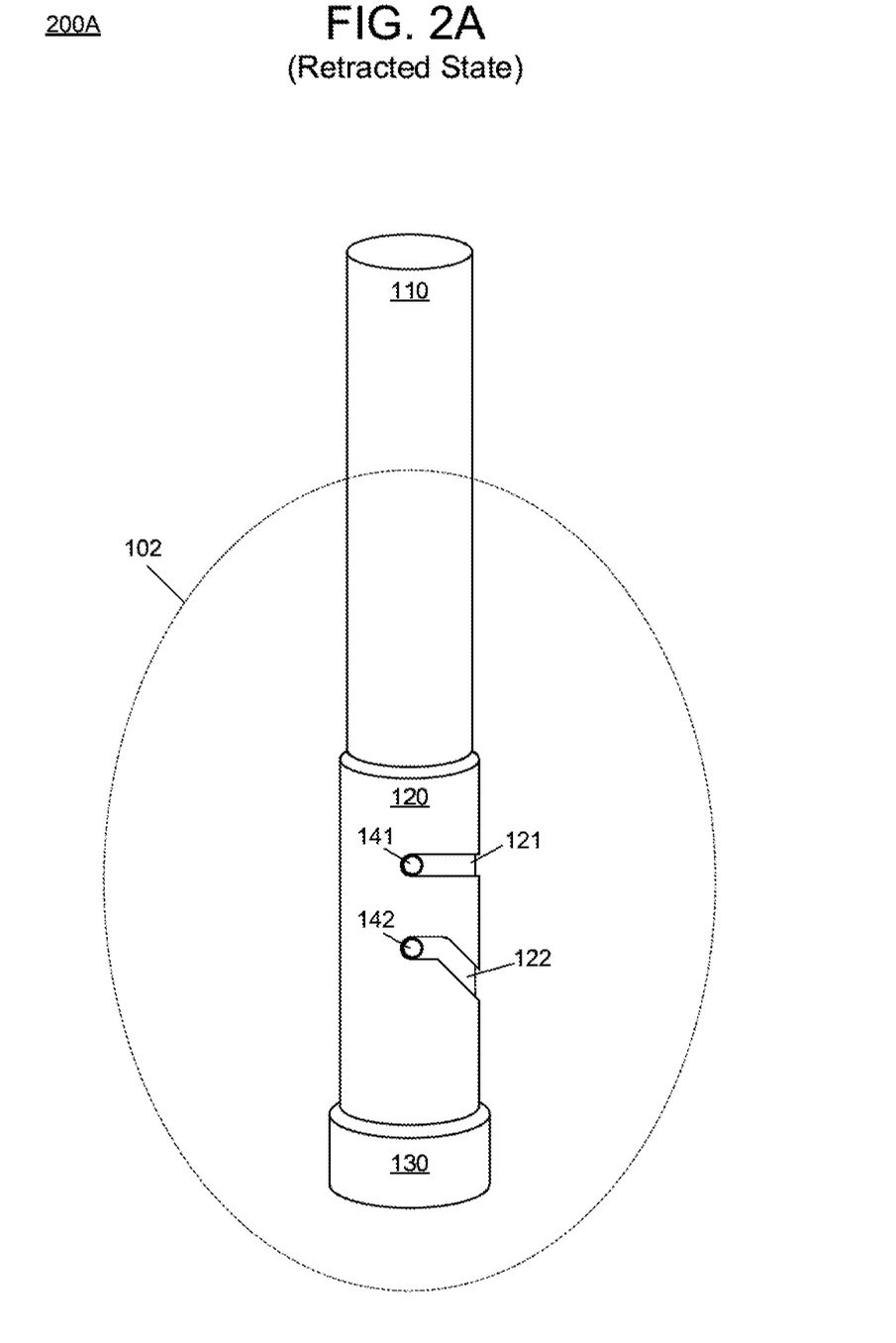
FIGS. 2A-2C are diagrams illustrating a process of turning the turning mechanism causing a retractable leg spike to be activated in accordance with an example embodiment.
Figure 2B:
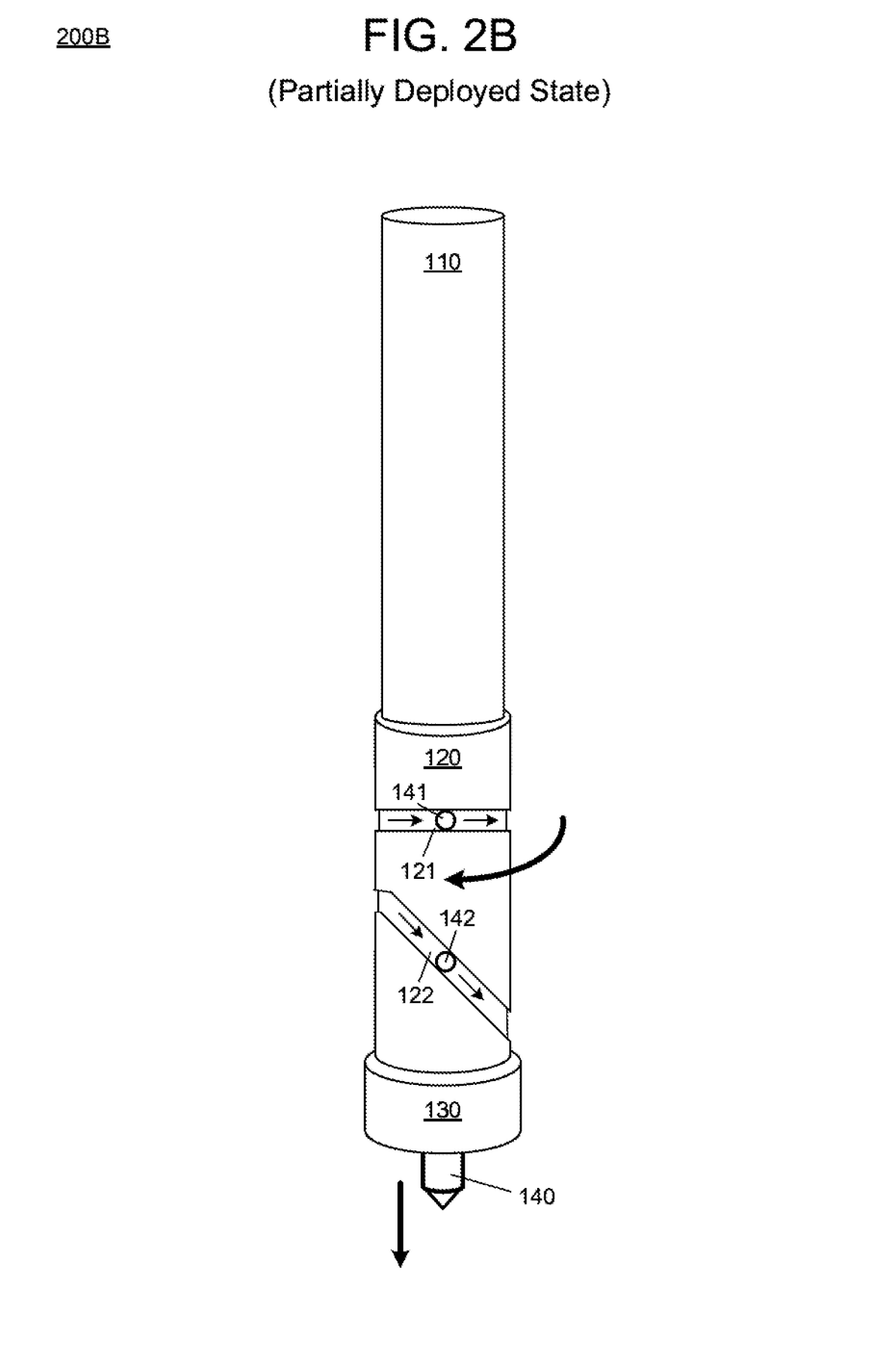
Figure 2C:
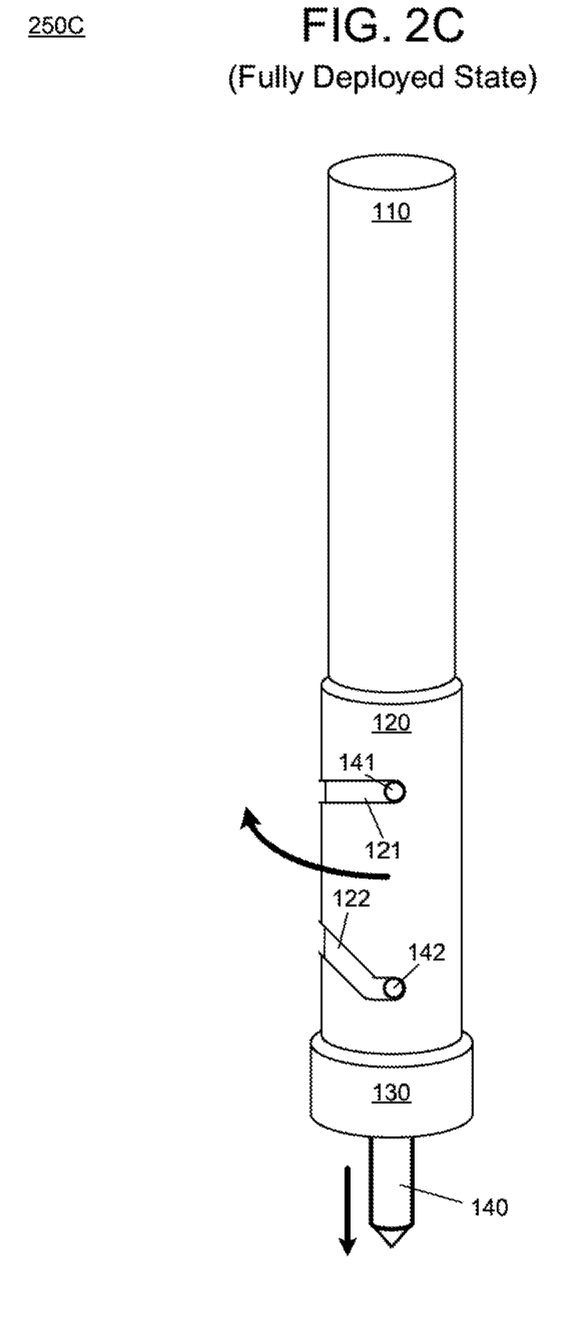

FIGS. 2A-2C illustrate a process of deploying the retractable leg spike based on a turning mechanism in accordance with example embodiments. In the examples of FIGS. 2A-2C, the turning mechanism includes an outer tube section which is turned/rotated around an inner tube section. The outer tube section can move both laterally and vertically with respect to the inner tube section, while the inner tube section remains statically positioned (i.e., it does not move). In the examples of FIGS. 2A-2C, the inner tube section 110 corresponds to the tripod leg 110 shown in FIG. 1A.

Referring to FIG. 2A, a view of a retractable leg apparatus 102 in a retracted state 250A is shown. The tripod leg 110 includes a leg spike 140 (shown in FIGS. 2B and 2C) enclosed inside a hollow area of the tripod leg 110. The tripod leg 110 is referred to herein as an inner hollow tube section. In addition, an outer tube section 120 has been fastened around the exterior of the tripod leg 110. The outer tube section 120 includes a first slot 121 and a second slot 122. The lower portion of the retractable leg apparatus 102 has a foot 130 which provides an additional flat surface of the tripod leg to stand on when the leg spike is not deployed.

According to various embodiments, the tripod leg 110 includes the leg spike 140 positioned/encased therein. An upper pin 141 is attached to the inner tube portion 110 and a sliding pin 142 positioned below the upper pin 141 is attached directly to the leg spike 140 and passes through a slot 113 (shown in FIG. 3A) of the inner tube section 110.

The upper pin 141 is positioned within the first slot 121 of the outer tube section 120 and the sliding pin 142 is positioned within the second slot 122 of the outer tube section 120. The upper pin 141 only moves laterally based on a lateral shape of the first slot 121. Meanwhile, the sliding pin 142 which is positioned within the second slot 122 is configured to slide in both a lateral and vertical direction at the same time based on a diagonal shape of the second slot 122. When the turning force is applied (e.g., by a hand of a user), the lateral sliding for both the upper pin 141 and the sliding pin 142 may be the same while the sliding pin 142 is the only pin that moves downward at the same time. This downward movement causes the leg spike 140 (which is attached to the sliding pin 142) to move downward and out of a bottom of the inner tube section 110 and the outer tube section 120. For example, the outer tube section 120 may include a hole or other recess in the foot 130 which enables the leg spike 140 to move freely in and out of the inner tube section 110.

In the example of FIG. 2A, the upper pin 141 is positioned at a far left-side of the first slot 121 and the sliding pin 142 is positioned at a far left-side of the second slot 122. These positions of the pins are the positions for the retracted state of the leg spike. The second slot 122 may include a recess (further shown in FIG. 3A) which is parallel to the first slot 121 and which allows helps the sliding pin 142 come to rest and stay at rest without pushing up or down due to the springs that are attached to the leg spike (further described herein with respect to FIG. 3B). The user may turn the outer tube section 120 with their hand causing the outer tube section 120 to move while the inner tube section 110 remains in its place and is static. However, due to the pins 141 and 142, along with the slots 121 and 122, the leg spike can be deployed.

FIG. 2B illustrates a process of partially deploying the leg spike 140 into a partially deployed stated 150B by turning the outer tube section 120 to the left-hand side of the drawing in FIG. 1C. In response the turning force, the upper pin 141 slides to the right along the first slot 121 while the vertical position of the upper pin 141 remains the same. That is, the upper pin 141 moves laterally but not vertically. The upper pin 141 is not attached to the leg spike 140 and therefore does not interfere with the movement of the leg spike 140. Meanwhile, the sliding pin 142 moves both laterally (right) and vertically (downward) as a result of the turning force. Here, the sliding pin 142 is connected to the leg spike 140. The downward movement of the sliding pin 142 causes the attached leg spike 140 to move downward as well while the inner tube section 110 containing the leg spike 140 does not move laterally or vertically. Instead, the inner tube section 110 remains statically in place and the outer tube section 120 moves causing the leg spike 140 to move.

Meanwhile, the upper pin 141 is held vertically in place by the shape of the first slot 121 which prevents the outer tube section 120 from moving vertically with respect to the inner tube section 110. In this case, the outer tube section 120 rotates around the inner tube section 110 through lateral movement, but does not move vertically. Accordingly, the outer tube section 120 does not interfere with the vertical movement of the leg spike 140.

FIG. 2C illustrates a fully deployed state 250C of the leg spike 140 which happens when the user continues to turn the outer tube section 120 to the left until the upper pin 141 and the sliding pin 142 reach an end of the first slot 121 and the second slot 122, respectively. The lateral distance that the upper pin 141 and the sliding pin 142 both move as a result of the turning force being applied is the same. However, the upper pin 141 does not move vertically. Instead, only the sliding pin 142 changes position vertically by moving farther down the shaft of the inner tube section 110 causing the leg spike to be driven out of the bottom of the inner tube section 110.

It should be appreciated that the leg spike 140 may be transitioned from the fully deployed state 250C back to the fully retracted state 250A by turning the outer tube section 120 the opposite direction thereby causing the leg spike 140 to move upward into a retracted state within the inner tube section 110.

Figure 3A:
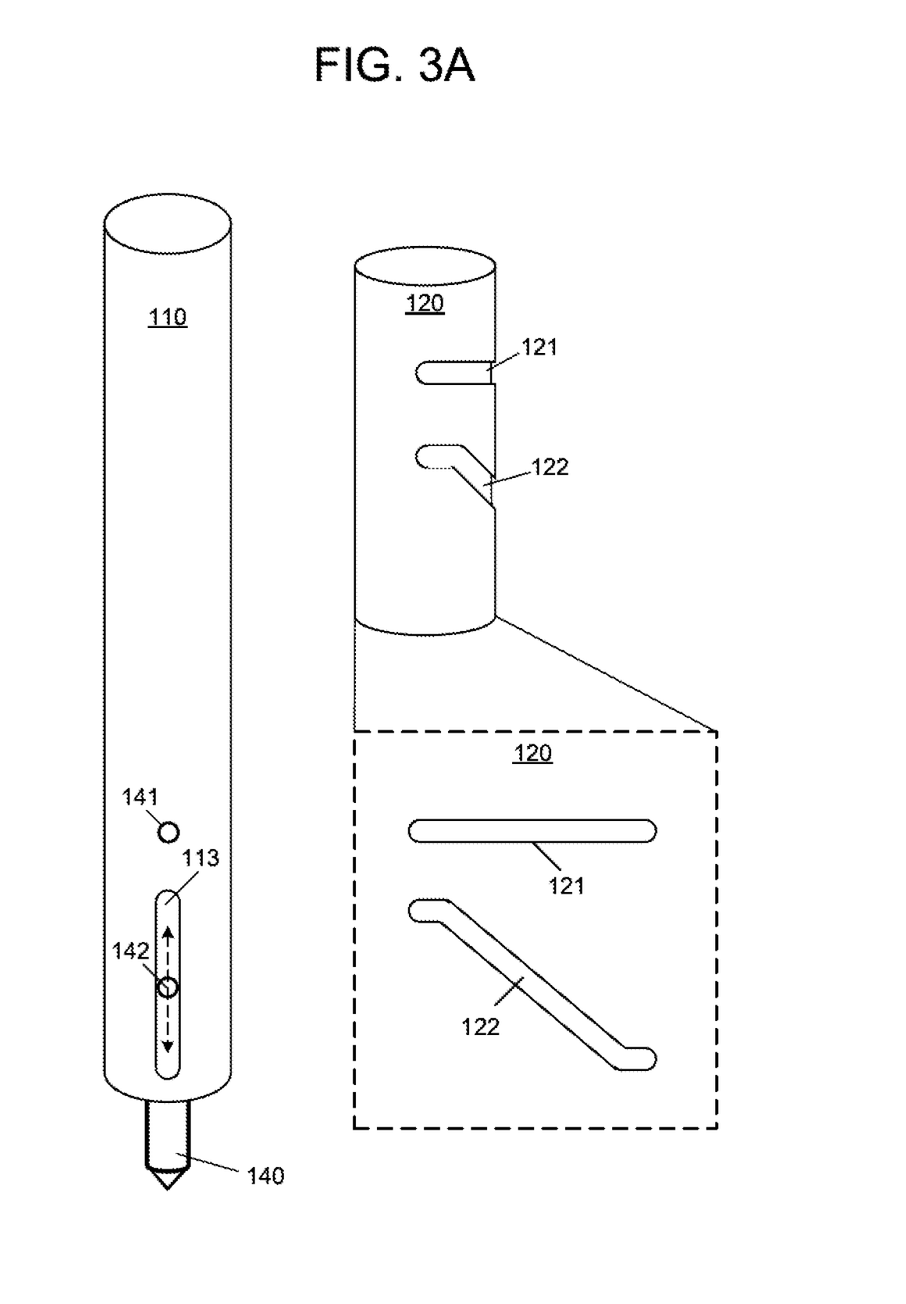
FIG. 3A is a diagram illustrating a detailed view of an inner hollow tube section and an outer hollow tube section of a turning mechanism in accordance with an example embodiment.
Figure 3B:
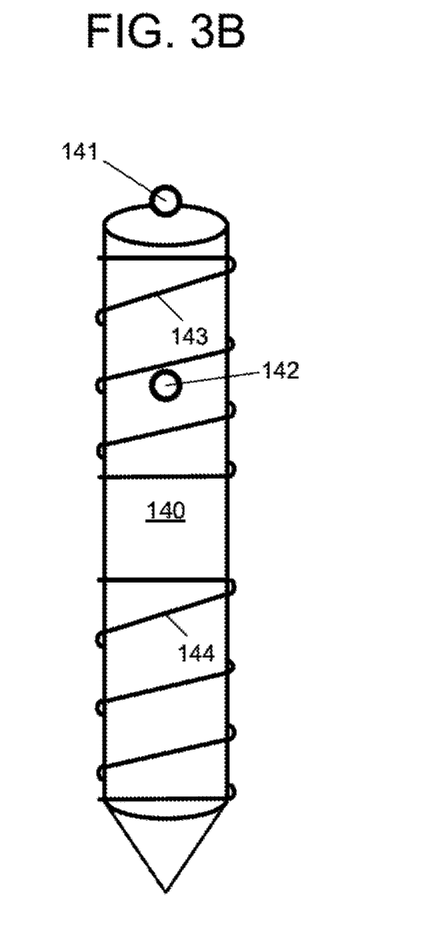
FIG. 3B is a diagram illustrating a detailed view of a leg spike in accordance with an example embodiment.

FIGS. 3A and 3B provide additional details of the inner tube section 110 and the outer tube section 120 include the locations of the pins and the slots that hold the pins. Referring to FIG. 3A, the inner tube section 110 is shown with the upper pin 141 attached to an exterior of the inner tube section 110. Meanwhile, the sliding pin 142 is attached to the leg spike 140 which is positioned inside the inner tube section 110. The sliding pin 142 is exposed via the third slot 113 within the inner tube section 110. The third slot 113 is an opening in the inner tube section 110 which enables the sliding pin 142 attached to the leg spike 140 to protrude outward from the inner tube section 110. Thus, the sliding pin 142 can fit within the second slot 122 of the outer tube section 120 and move in a diagonal direction (both laterally and vertically) while the upper pin only moves in a lateral direction.

Further shown in FIG. 3A is a flattened view of an exterior of the outer tube section 120 unrolled into a flat shape. As can be seen, the first slot 121 is approximately parallel to the ground while the second slot 122 runs diagonally to the ground at an angle that is approximately 45°. It should be appreciated that the angle of the diagonal can vary depending on the desired use of the tripod and/or the leg spike. As an example, the angle of the diagonal may be between 0° and 90°. As a result of the design, by increasing the steepness of the angle, the distance the leg spike travels is increased resulting in a quicker deployment (less turning force needed).

FIG. 3B illustrates a perspective view of the leg spike 140 that is positioned inside of the inner hollow tube 110 shown in FIG. 3A. The leg spike includes the sliding pin 142 attached thereto in such a way that the sliding pin 142 and the leg spike 140 move downward at the same time. Meanwhile, the upper pin 141 is not attached to the leg spike 140 and does not interfere with the downward movement of the leg spike 140. However, the upper pin 141 can block or otherwise restrict the leg spike 140 from moving farther upward within the hollowed inner tube section 110 since it is blocking the remaining portion of the tube.

Furthermore, the leg spike 140 also includes an upper spring 143 which may be wrapped around an upper portion of the leg spike 140 and contacts an interior surface of the inner tube section 110. As a result of the contact from both the leg spike 140 and the inner tube section 110, the upper spring 143 may compress when the leg spike 140 is in a retracted state. In addition, the leg spike 140 may include a lower spring 144 that compresses when the leg spike 140 is in a deployed state. The upper spring 143 may help push the leg spike 140 outward when the turning force is applied on the outer tube section 120 to deploy the leg spike 140. Likewise, the lower spring 144 may help push the leg spike 140 back into the hollow portion of the inner tube section 110 when the turning force is applied in the opposite direction.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A tripod apparatus, comprising:
one or more legs, wherein each leg comprises:
an inner hollow tube section comprising a retractable spike, wherein the inner hollow tube section further comprises a static pin that is attached thereto and a sliding pin positioned within a recess, wherein the sliding pin is attached to the retractable spike and enables the retractable spike to slide within the recess, and
an outer hollow tube section that fits over the inner hollow tube section and comprises a first slot that receives the static pin and a second slot that receives the sliding pin, wherein the second slot is below the first slot and the second slot allows the sliding pin to move up or down with respect to the outer hollow tube section causing the retractable leg spike to in and out of the inner hollow tube section when a turning force is applied, and the first slot prevents the static pin from moving up and down with respect to the hollow tube section when the turning force is applied.

2. The tripod apparatus of claim 1, wherein the first slot and the second slot are arranged at an angle with respect to each other, wherein the angle is greater than 0° and less than 90°.

3. The tripod apparatus of claim 1, wherein the retractable spike is partially pushed out of a bottom of the inner hollow tube section when a partial turning force is applied to the outer hollow tube section.

4. The tripod apparatus of claim 3, wherein the retractable spike is fully pushed out of the bottom of the inner hollow tube section when a full turning force is applied to the outer hollow tube section.

5. The tripod apparatus of claim 1, wherein the inner hollow tube section comprises a third slot which holds the sliding pin and allows the sliding pin to move up and down therein.

6. The tripod apparatus of claim 1, wherein the retractable spike comprises a rod that fits inside the inner hollow tube section and a spike at the bottom of the rod, wherein the sliding pin is attached to the rod.

7. The tripod apparatus of claim 6, wherein a plurality of springs are wrapped around the rod within the inner hollow tube section and provide spring force in an opposite direction when the retractable spike is pushed out from the bottom of the inner hollow tube section.

8. The tripod apparatus of claim 1, wherein the outer tube section comprises a foot with a hole through which the retractable spike moves up and down.

9. An apparatus, comprising:
an inner hollow tube section comprising a retractable leg spike, wherein the inner hollow tube section further comprises a static pin that is attached thereto and a sliding pin positioned within a recess, wherein the sliding pin is attached to the retractable leg spike and enables the retractable leg spike to slide within the recess; and
an outer hollow tube section that fits over the inner hollow tube section and comprises a first slot that receives the static pin and a second slot that receives the sliding pin, wherein the second slot is below the first slot and the second slot allows the sliding pin to move up or down with respect to the outer hollow tube section causing the retractable leg spike to move in and out of the inner hollow tube section when a turning force is applied, and the first slot prevents the static pin from moving up and down with respect to the hollow tube section when the turning force is applied.

10. The apparatus of claim 9, wherein the first slot and the second slot are arranged at an angle with respect to each other, wherein the angle is greater than 0° and less than 90°.

11. The apparatus of claim 9, wherein the retractable leg spike is partially pushed out of a bottom of the inner hollow tube section when a partial turning force is applied to the outer hollow tube section.

12. The apparatus of claim 11, wherein the retractable leg spike is fully pushed out of the bottom of the inner hollow tube section when a full turning force is applied to the outer hollow tube section.

13. The apparatus of claim 9, wherein the inner hollow tube section comprises a third slot which holds the sliding pin and allows the sliding pin to move up and down therein.

14. The apparatus of claim 9, wherein the retractable leg spike comprises a rod that fits inside the inner hollow tube section and a spike at the bottom of the rod, wherein the sliding pin is attached to the rod.

15. The apparatus of claim 14, wherein a plurality of springs are wrapped around the rod within the inner hollow tube section and provide spring force in an opposite direction when the retractable leg spike is pushed out from the bottom of the inner hollow tube section.

16. The apparatus of claim 9, wherein the outer tube section comprises a foot with a hole through which the retractable leg spike moves up and down.

* * * * *